Aug. 18, 1964  P. O. RICHTER ETAL  3,145,171
VACUUM FILTRATION SYSTEM

Filed June 9, 1960  4 Sheets—Sheet 1

INVENTORS
PAUL O. RICHTER
JOHN L. KING

Robert R. Finch
Attorney

Aug. 18, 1964 P. O. RICHTER ETAL 3,145,171
VACUUM FILTRATION SYSTEM
Filed June 9, 1960 4 Sheets-Sheet 3
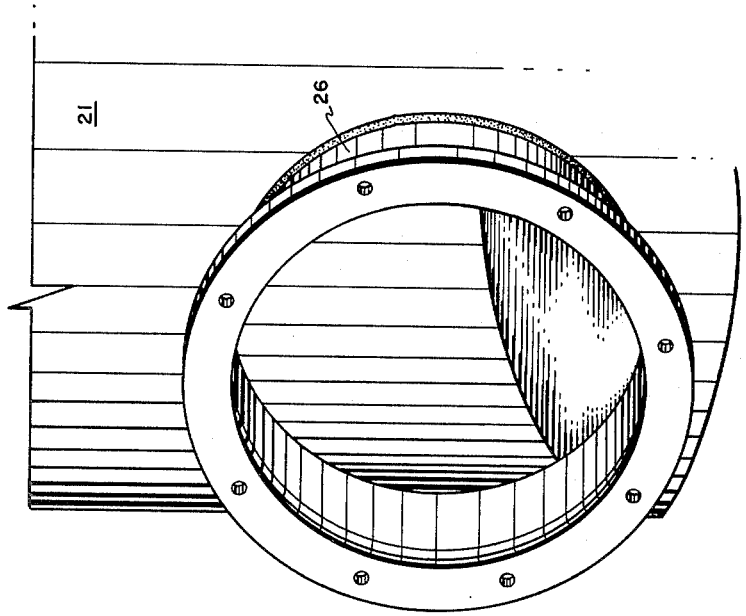
FIG. 3
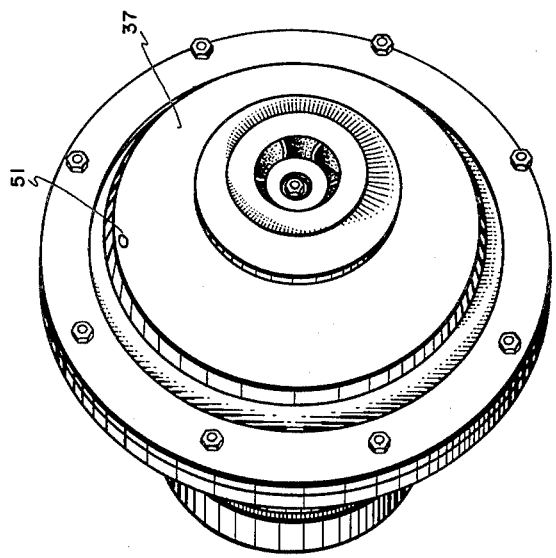
INVENTORS
PAUL O. RICHTER
JOHN L. KING
Robert R. Finch
Attorney Aug. 18, 1964

P. O. RICHTER ET AL 3,145,171

VACUUM FILTRATION SYSTEM

Filed June 9, 1960

*INVENTORS*
PAUL O. RICHTER
JOHN L. KING

*Attorney*

3,145,171
VACUUM FILTRATION SYSTEM
Paul O. Richter, Salt Lake City, Utah, and John L. King, San Rafael, Calif., assignors to The Eimco Corporation, Salt Lake City, Utah, a corporation of Delaware
Filed June 9, 1960, Ser. No. 34,986
1 Claim. (Cl. 210—406)

This invention relates generally to vacuum filters and in particular to a novel combination of a pump and so-called vacuum receiver enabling efficient separate removal filtrate.

As is well known, in vacuum filtration the filtrate along with large quantities of combined and/or mixed air is withdrawn from the filter into a so-called vacuum receiver under the influence of applied vacuum thence separated, and the gas, usually air, discarded while the filtrate is pumped to further processing or perhaps recycled for use as wash liquor ni filtration.

Because of the combined air as well as inevitable variation in flow rates and the direct effect of vacuum, filtrate pumping has proven to be a vexing problem, the solution to which has heretofore involved equipment and operating expenses totally out of proportion to the materials handled.

For instance, in order to prime the filtrate pump it has been heretofore necessary to provide a high static head between the pump and filtrate receiver in order to satisfy the demand or "net positive suction head" of the pump to overcome vacuum in the receiver and initiate flow. This requires mounting of the pump at an elevation considerably below the filtrate receiver to provide height for building up the necessary head. Such static head requirement results in surges or uneven pumping rates because the pump does not prime until sufficient head is established and, once primed, may continue to pump until the static head is at least partially depleted whereupon pumping ceases and the cycle must be repeated. This is particularly trouble-some where the filtrate volume varies over a wide range. Air locks in the pumping system aggravate the problem considerably by requiring an even higher static head to prime the pump hence contribute even more to surging.

In brief then, prior filtrate removal systems suffer in common from the disadvantages of high height requirements for pump priming and the inability to handle varying rates of filtrate supply at low flow rates insufficient to maintain the required head.

It is a primary object of the present invention to provide a filtrate removal system capable of removing filtrate from a negative pressure atmosphere as in a vacuum receiver at flows ranging from a mere trickle to full pump capacity.

A further object is the provision of a pump combined in a particular manner in a vacuum filtration system closely proximate the receiver thereby reducing space requirements of the installation.

Other objects and advantages of the invention will be apparent to those skilled in the field to which the invention pertains by a persual of the following description in conjunction with the accompanying drawings; it being understood that such description is by way of example only and is not to be taken as limiting the invention, the scope of which is defined by the appended claims and the equivalents thereof rather than by the description preceding them.

In the drawings:

FIG. 3 is a perspective view showing the pump in relation to the mounting flange on a vacuum receiver.

Figure 1:
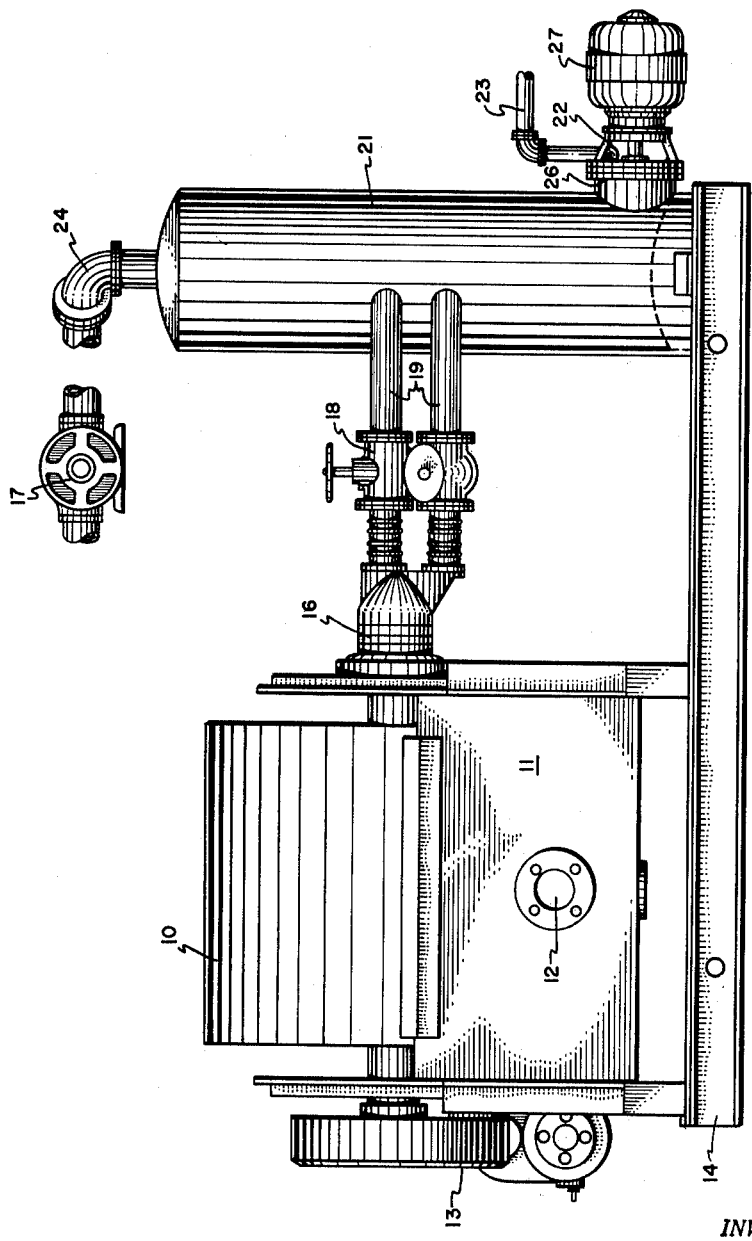
FIG. 1 is a side elevational view of a vacuum filter system embodying the invention.
Figure 2:
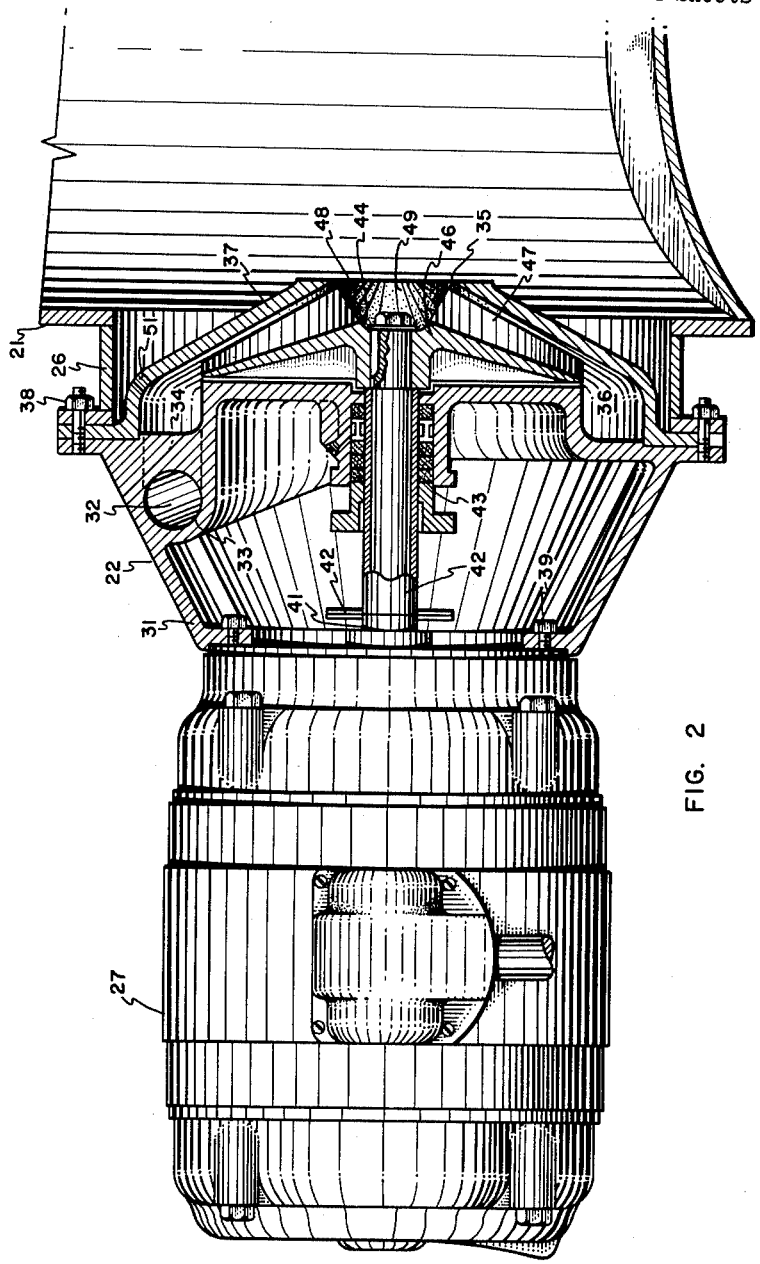
FIG. 2 is a side sectional view of the pump of the invention combined with a filtrate receiver in accordance with the invention.
Figure 5:
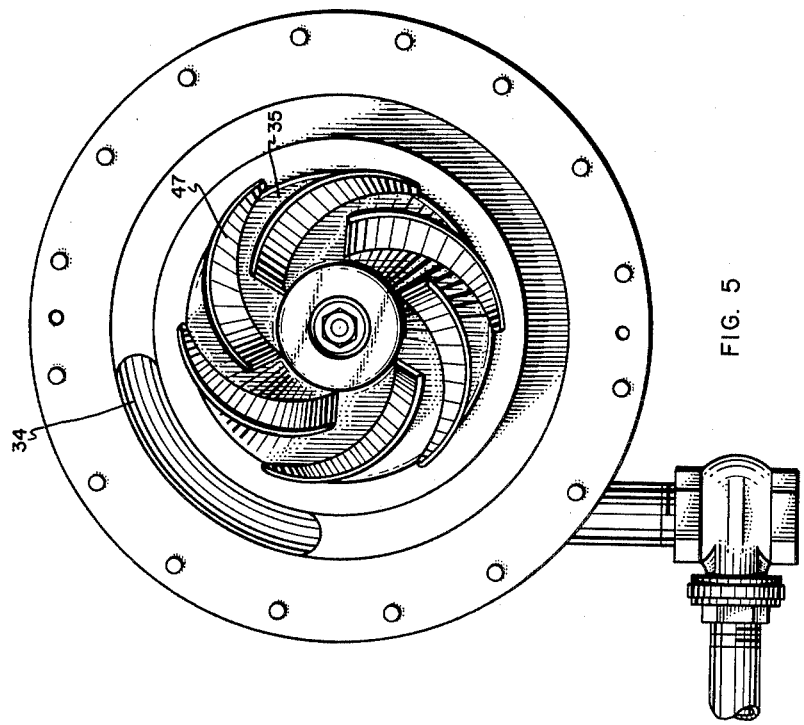
FIG. 5 is a front view of the pump of FIG. 4 taken in direction of the arrow 5 on FIG. 4.
Figure 4:
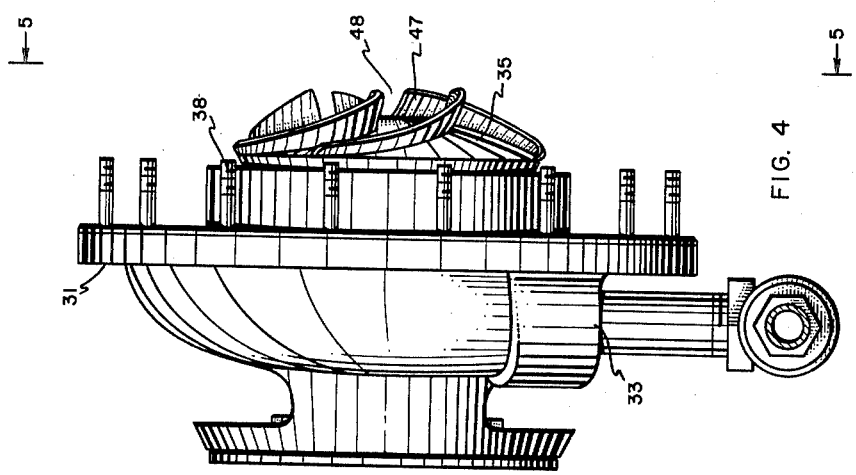
FIG. 4 is a top elevational view of the pump with cover removed.

The system illustrated in FIG. 1 comprises a vacuum drum 10 rotatably mounted for partial submergence in a slurry tank 11 to which slurry is supplied via a suitable port 12. Usual driving means, collectively designated 13, are provided and the unit is mounted on a suitable base 14.

By means of a suitable valve 16 and internal piping, not shown, vacuum generated by a vacuum pump 17 is applied to the drum face and filtrate is withdrawn through the internal piping, valve 16, then through valves 18 and conduits 19 tangentially into a receiver tank 21 at an intermediate elevation therein. The filtrate swirls toward the bottom of the receiver to be removed by a pump 22 (to be hereinafter described in detail) for eventual discharge via conduit 23 while air or vapor is drawn from an upper portion of the receiver via conduit 24, which connects the system to the vacuum pump 17, whence it is discharged.

The pump 22, is mounted on the receiver by a flange 26 and communicates directly with the interior thereof. A suitable constant speed motor 27 is provided to drive the pump and such motor, together with the pump, forms an easily handled unit.

The pump 22 comprises a base 31 in which is formed a discharge passage 32 terminating at an outlet 33 and into which liquid is supplied through a port 34 from an annular volute 36 defined between the base 31 and a cover 37 secured to the base as by fasteners 38. The base, cover and volute combine to define the boundaries of a plenum space 35. The base 31 is secured directly to the drive motor 27 by suitable fasteners 39 and is mounted so that the motor shaft 41 and pump shaft 42 are axially aligned and joined by a suitable coupling 42.

A suitable shaft seal 43 is provided in the pump base through which the shaft 42 passes to terminate inside the pump. On the inner end of and rotable with such shaft in the plenum space defined between the base and cover is mounted an impeller 44 of particular construction.

It will be noted that the impeller, which comprises a cone shaped base 46, vanes 47 and a central eye 48 defined by the inner ends of the vanes, is of the semi-open type without cover across the upper vane edges. The cover plate 37 is of a shape to follow the contour of the vanes and is mounted in closely spaced relationship therewith.

It will be noted that the annular volute 36 is offset from the plane of rotation of the impeller and also that the impeller terminates at or short of the volute. The impeller is of the type in which the liquid is subjected to constant acceleration so that maximum velocity is attained for discharge.

In accordance with the invention, the pump is rendered self-priming and air locks eliminated at any flow rate by a combination of features which include an unobstructed center opening 49 in cover 37, and a vent 51 in a high point of the volute. The central unobstructed opening 49 provides free ingress of liquid to the eye and thence to the impeller while the vent 51 insures escape of air. In the latter connection, it is important that the vent be positioned at an elevation above the eye and it should be at the highest point of the pump to insure rapid air escape.

Thus, in the preferred embodiment shown, the pump is mounted with its impeller rotating in a substantially vertical plane and the vent is positioned at top dead center. As liquid rises in the tank it spills into and through the opening into the impeller, air escapes via the vent 51 and liquid discharges through openings 34 and 32.

It is important the eye and cover opening have sufficient area to handle large volumes of frothy material and should be of a cross-sectional area greater than that of the ultimate liquid discharge while, as shown in the drawings, the means, such as stub conduit or flange 26, providing communication between the pump and the interior of the receiver is of cross-sectional area greater than the eye 48. It is also important, particularly for operation in starved conditions, that the edge of cover opening 49 be sharp or knife edge as this aids in breaking up froth bubbles thereby enhancing air removal.

Taking into account operation of the entire filtration system, the pump should have a capacity at least equal to the highest average filtrate supply rate. This means that the pump will operate in a starved condition a great deal of the time. However, due to its ability to immediately discharge all liquid reporting to the eye, no surges occur but instead smooth pumping at a rate equal to filtrate supply is maintained.

When the pump is in full operation, vent 51 serves to bypass or recycle a stream of liquid. This is a small amount and does not materially affect pump capacity, but does aid in keeping the vent cleared.

By special modifications, the pump can be adapted to use in a horizontal position if required. In such situations, the vent 51 would be provided with an extension to extend above the eye inlet and an upwardly extending concavity provided in the volute at the vent location to serve as an air accumulator. Such a pump would not be the equivalent of the vertically mounted pump, but would be useful in special situations.

We claim:

In apparatus for removing filtrate feed collected in a vacuum filtration system having a filter, feed means, a source of vacuum and a conduit connecting the source of vacuum to the filter and for carrying filtrate as well as gas therefrom; means interposed in said conduit between said filter and said vacuum source for effecting removal of filtrate from the system separately from said gas, said means comprising a closed vessel connected at the upper portion to said conduit for discharging gas and at an intermediate portion to said conduit for receiving gas and filtrate from said filter, and pump means for removing liquid filtrate from a lower portion of said vessel; said pump means comprising a base having a raised circular central section, a dome-shaped cover secured to said base concentrically around and spaced from said raised center section to thereby define both an annular volute about said central section and an adjoining central plenum space between the top of said central section and said cover, liquid discharge means in said volute, a vane type impeller mounted for rotation in said central plenum space between said base and said cover, said impeller being of substantially the same maximum diameter as said central section and having its vanes spaced closely adjacent the interior wall of said cover, said impeller having an unobstructed eye in its center providing access to the vanes thereof and said cover having a sharp edged central opening substantially aligned with said eye to provide direct access to said eye through said opening, means mounting said pump in the side wall of said vessel with said impeller in a substantially vertical plane with said sharp edged central opening facing inwardly of and in direct communication with the interior of said vessel and vent means in said cover above said central opening providing direct communication between said volute and the interior of said vessel.

References Cited in the file of this patent

UNITED STATES PATENTS

| | | |
|---|---|---|
| 1,675,199 | Smith | June 26, 1928 |
| 1,675,200 | Smith | June 26, 1928 |
| 2,388,939 | Stepanoff | Nov. 13, 1945 |
| 2,528,642 | Cover | Nov. 7, 1950 |
| 2,869,674 | Vandenburgh | Jan. 20, 1959 |
| 2,961,968 | Thomas et al. | Nov. 29, 1960 |